E. LANNAY.
CLOD FENDING AND PULVERIZING ATTACHMENT FOR SHOVEL PLOWS.
103203     Patented May 17 1870
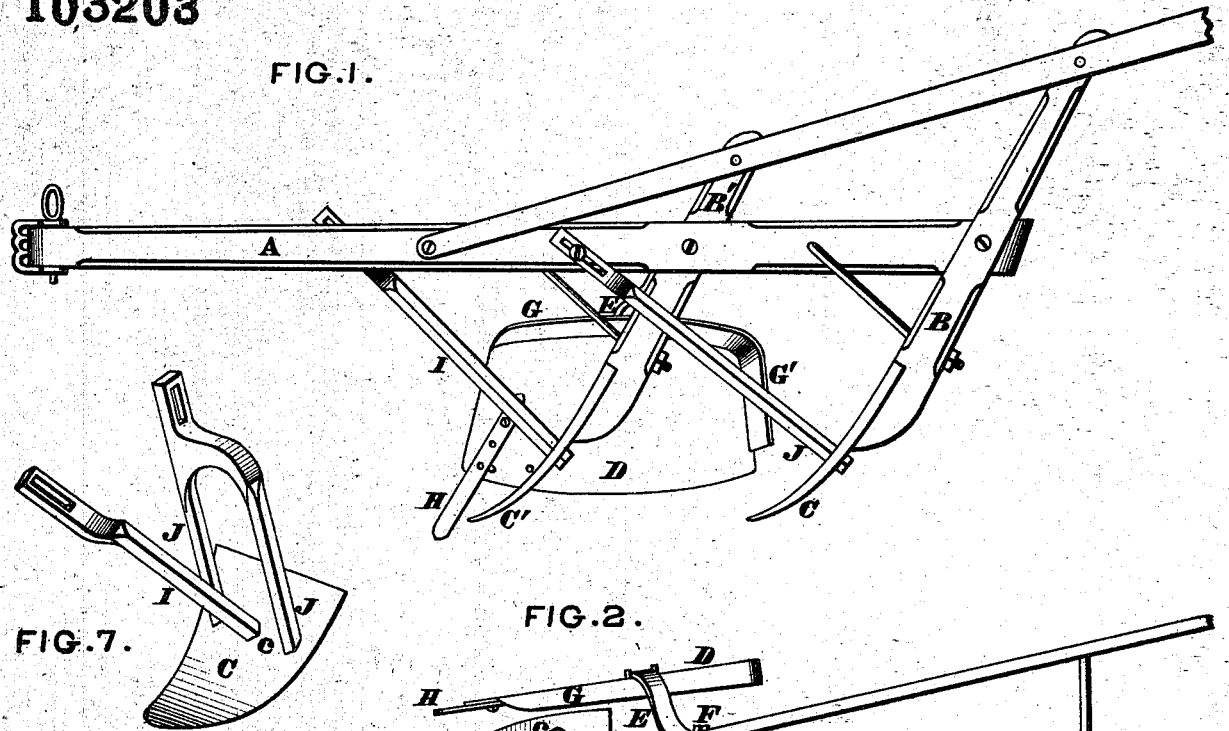
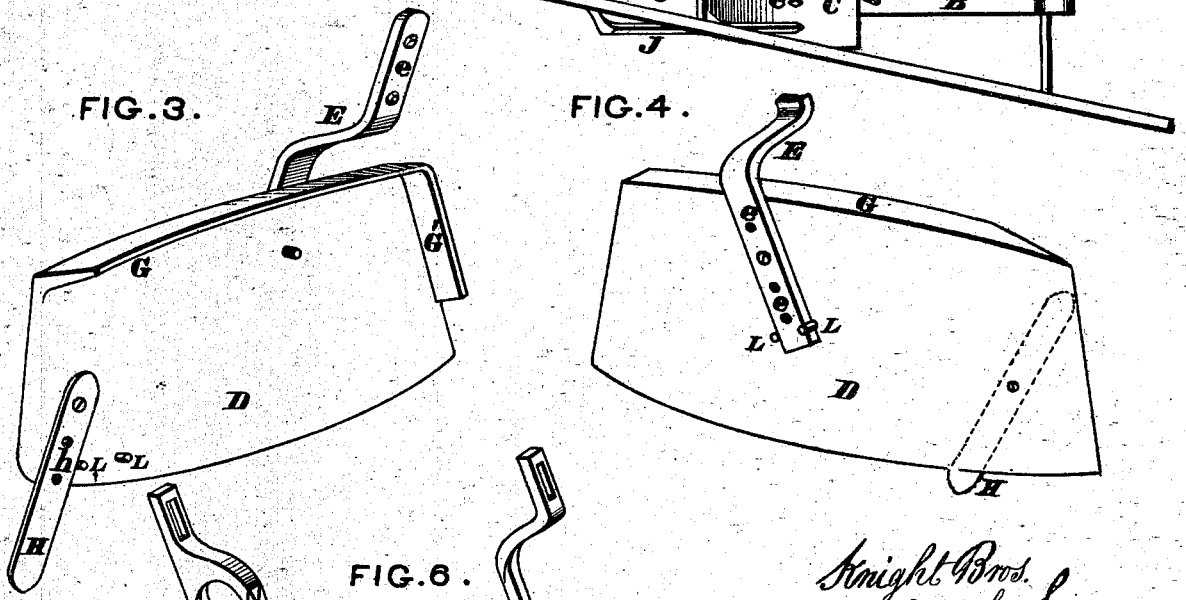
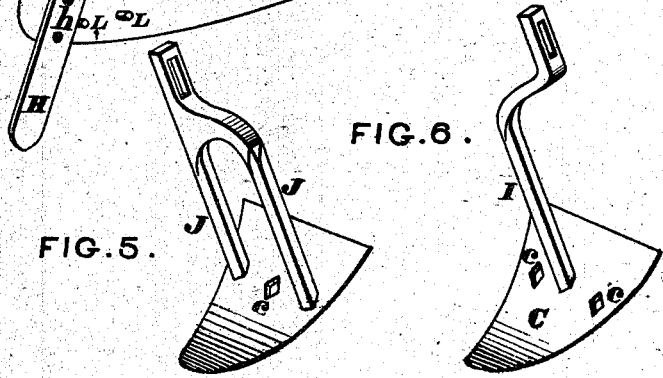

United States Patent Office.

EDWARD LANNAY, OF MOWRYTOWN, OHIO.

Letters Patent No. 103,203, dated May 17, 1870.

IMPROVEMENT IN CLOD-FENDERS AND PULVERIZING ATTACHMENT FOR SHOVEL PLOWS.

The Schedule referred to in these Letters Patent and making part of the same.

I, EDWARD LANNAY, of Mowrytown, Highland county, Ohio, have invented a new and useful Clod-fending and Pulverizing Attachment for Shovel-Plows, of which the following is a specification.

Nature and Objects of the Invention.

My invention relates to devices to be attached to an ordinary single or double-shovel plow, or to a cultivator, whereby the ground becomes effectually pulverized, and whereby the corn or other growing crop is protected from the contact of clods, rocks, and other indurated masses.

General Description with Reference to the Drawings.

Figure 1 is a side elevation of a double-shovel plow furnished with my clod-fending and pulverizing attachments.

Figure 2 is a top-view of the same.

Figures 3 and 4 are enlarged perspective views of my fender as viewed from the front and from the rear respectively.

Figures 5, 6, and 7 represent a shovel provided with my pulverizing attachments.

A represents the beam.

B B' the sheaths or standards, and

C C' the shares or shovels of a common double-shovel plow.

My clod-fender consists of a plate or board, D, which is attached by means of an arm, E, and bolts, F, to that side of the plow which is nearest to the growing crop.

This plate has the represented approximately trapezoidal shape, with convex upper and under edges, and an inwardly projecting flange, G G', from the upper and a portion of the rear edge.

A series of bolt-holes, e, in the arm E, permits the fender to be adjusted up or down.

The shape of the arm E is such as to cause the forward end of the fender to approach nearer the center line of the plow than does the rear end.

Secured, either obliquely forward or backward, to the foremost lower corner of the fender is a knife, H, which knife has a series of bolt-holes, n, to enable it to be set up or down, as may be desired.

The knife H, being sharpened at both ends and both edges, can be used in four different positions, with as many distinct cutting-edges, so that, as one edge wears, another and fresh edge can be made to take its place.

In order to thoroughly pulverize the clods, and to sever refractory or indurated masses of sod and other obstructions, I provide a knife, which may be single-bladed as I, or double-bladed as J, one knife to each shovel.

The points of these knives enter sockets or apertures, c, in the shovels, and their shanks are bolted to the beam. These knives project from the shovels in an upward and forward direction, in such a manner as to form, with the surface of the shovels, an acute rather than an obtuse angle.

In this way each shovel may be furnished with a single blade, as in fig. 6, or with a double blade, as in fig. 5, or, where a still more effective comminution of the ground is desired, each shovel may be armed with both a single and a double-bladed knife, giving three blades to each shovel, as in fig. 7.

Pins L hold the fender D and the knife H to their proper angular position.

Operation.

The plow being drawn along the ground contiguous to a row of growing corn, in the usual way, the clods and other hard and bulky masses are, by the fenders, prevented from falling upon the plants, while at the same time the curved under edge of the fender permits the more friable and finely-comminuted portions to escape under the front and rear edges of the fender toward the plants. At the same time the up-curved top of the fender, and the flange G' at its end, prevent the escape of clods or trash over or behind the fender.

The fender's front end being set somewhat inward, as seen in fig. 2, eases the escape of clods rearward as the plow passes on, and the vertical adjustability of the fender enables it to be set near to the ground for a very young crop, and at a greater elevation for one of larger growth.

Claims.

I claim herein as new and of my invention—

1. The flanged and adjustable clod-fender D G G', formed and adapted to operate substantially as set forth.

2. The provision of the adjustable knives H h at the front lower angle of the fender, as set forth.

3. The knives I or J J, whether single or double-bladed, projecting in an upward and forward direction, arranged and adapted to operate in the manner explained.

In testimony of which invention I hereunto set my hand.

EDWARD LANNAY.

Witnesses:
GEO. H. KNIGHT,
W. W. MCKNIGHT.